United States Patent [19]

Viasmensky

[11] Patent Number: 4,526,337
[45] Date of Patent: Jul. 2, 1985

[54] PROJECTOR STACKING STAND

[75] Inventor: Vladimir Viasmensky, Valley Stream, N.Y.

[73] Assignee: General Audio-Visual Inc., Valley Stream, N.Y.

[21] Appl. No.: 454,228

[22] Filed: Dec. 29, 1982

[51] Int. Cl.³ ............................................. F16M 1/00
[52] U.S. Cl. .................................... 248/639; 248/661
[58] Field of Search .............. 248/652, 660, 661, 665, 248/676, 639; 353/9, 122; 74/10.7; 108/4

[56] References Cited

U.S. PATENT DOCUMENTS

| | | | |
|---|---|---|---|
| 2,523,407 | 9/1950 | Williamson | 74/10.7 |
| 2,686,095 | 8/1954 | Carlson | 108/4 |
| 2,859,629 | 11/1958 | Parker et al. | 74/10.7 X |
| 3,093,030 | 6/1963 | Carrillo | 353/94 X |
| 3,219,303 | 11/1965 | Stryker | 248/280.1 |
| 3,912,385 | 10/1975 | Stokes | 353/94 |
| 4,098,099 | 7/1978 | Smith | 70/49 X |
| 4,148,453 | 4/1979 | Brantly | 211/13 X |

*Primary Examiner*—J. Fanklin Foss

*Attorney, Agent, or Firm*—Sprung Horn Kramer & Woods

[57] ABSTRACT

A projector stacking stand for supporting at least one image projector comprises a frame and at least one mounting platform connected to the frame with ends supporting an image projector. Each mounting platform is connected to the frame for enabling adjustment of the pitch, roll and yaw thereof relative to the frame by means of a gimbal having three discrete pivot axes corresponding to pitch, roll and yaw axes. The gimbal is moved about the pitch and roll axes by two shafts, each mounted on the gimbal for independent rotation with the axis thereof disposed parallel to the pitch axis and a cable for each shaft having at least one turn therearound. Each cable is connected to the frame under tension with a portion above and below the turn around the shaft and each shaft is rotatable to effect vertical movement thereof along its cable, whereby pitch adjustment is obtained by rotating the two shafts simultaneously in the same direction and roll adjustment is obtained by rotating the shafts individually. The platform is rotatable about the yaw axis relative to the gimbal for yaw adjustment.

7 Claims, 4 Drawing Figures

PROJECTOR STACKING STAND

BACKGROUND OF THE INVENTION

The present invention relates to a projector stacking stand for supporting at least one image projector with the ability to adjust the supported image projectors with respect to three degrees of freedom in order to align the image projected by each with a target image or area such as a screen.

In the field of multi-image projection, it is necessary to mount several projectors above each other and aim them precisely relative to each other. In order for each image to line up exactly with the other, the projector stacking stand which holds the projectors must be adjustable in pitch, yaw and roll.

While projector stacking stands are known in the art, these stands are usually cumbersome or highly complex in construction thus making them expensive to make and complicated to repair. An example of a prior art projector stacking stand can be seen in U.S. Pat. No. 4,148,453.

SUMMARY OF THE INVENTION

The main object of the present invention is to provide a projector stacking stand which eliminates the disadvantages of the prior art and which enables adjustment of the pitch, roll and yaw in a simple yet reliable manner.

This and other objects of the present invention are achieved in accordance with the present invention by a projector stacking stand for supporting at least one image projector comprising a frame, at least one mounting platform, each for supporting an image projector and means connecting the mounting platform to the frame for enabling adjustment of the pitch, roll and yaw thereof relative to the frame. The connecting means comprises a gimbal having three discrete perpendicular pivot axes corresponding to the pitch, roll and yaw axes, means for moving the gimbal about the pitch and roll axes comprising two shafts, means mounting each shaft on the gimbal for independent rotation with the axes thereof disposed parallel to the pitch axis, a cable for each shaft having at least one turn therearound, means connecting each cable to the frame under tension for the portion above and the portion below the turn around the shaft and means for rotating each shaft to effect vertical movement of each along its cable. As a result, pitch adjustment is obtained by rotating the two shafts simultaneously in the same direction and roll adjustment is obtained by rotating the shafts individually. Means are also provided for rotating the platform about the yaw axis relative to the gimbal.

In a preferred embodiment of the invention, the means for rotating the platform about the yaw axis also comprises a rotatable shaft and cable assembly wherein a third shaft is rotatably mounted on the gimbal and a third cable has at least one turn around the third shaft and is looped about a member connected to the platform with the ends of the cable connected on the other side of the shaft to the platform and under tension.

The frame preferably comprises four parallel vertical members with two front and two rear members disposed in parallel transverse rows. The pitch axis of the gimbal is vertically fixed in the two rear members and the means connecting the cables to the frame is disposed at the two front members and comprise first and second cylindrical members each fixed horizontally to a front member on one side of the shaft and about which the cable is looped and means fixed to the front members on the other side of the shafts and connected to the ends of the cables and including springs applying tension to the cables.

The wrap of the cable produces such high frictional force between it and its shaft, that motion of the platform without rotation of the shaft is extremely unlikely. Therefore, inadvertant motion of the platform can be eliminated by preventing rotation of the shaft, either by means of a releasable locking means, or by means for applying a friction force, by means of a lock nut or the like, to prevent free rotation of the shaft.

The cables preferably comprise nylon jacketed stainless steel, however other cables can be utilized.

The present invention will now be described in detail hereinafter in conjunction with the following drawings, wherein:

DETAILED DESCRIPTION OF THE INVENTION

Figure 1:
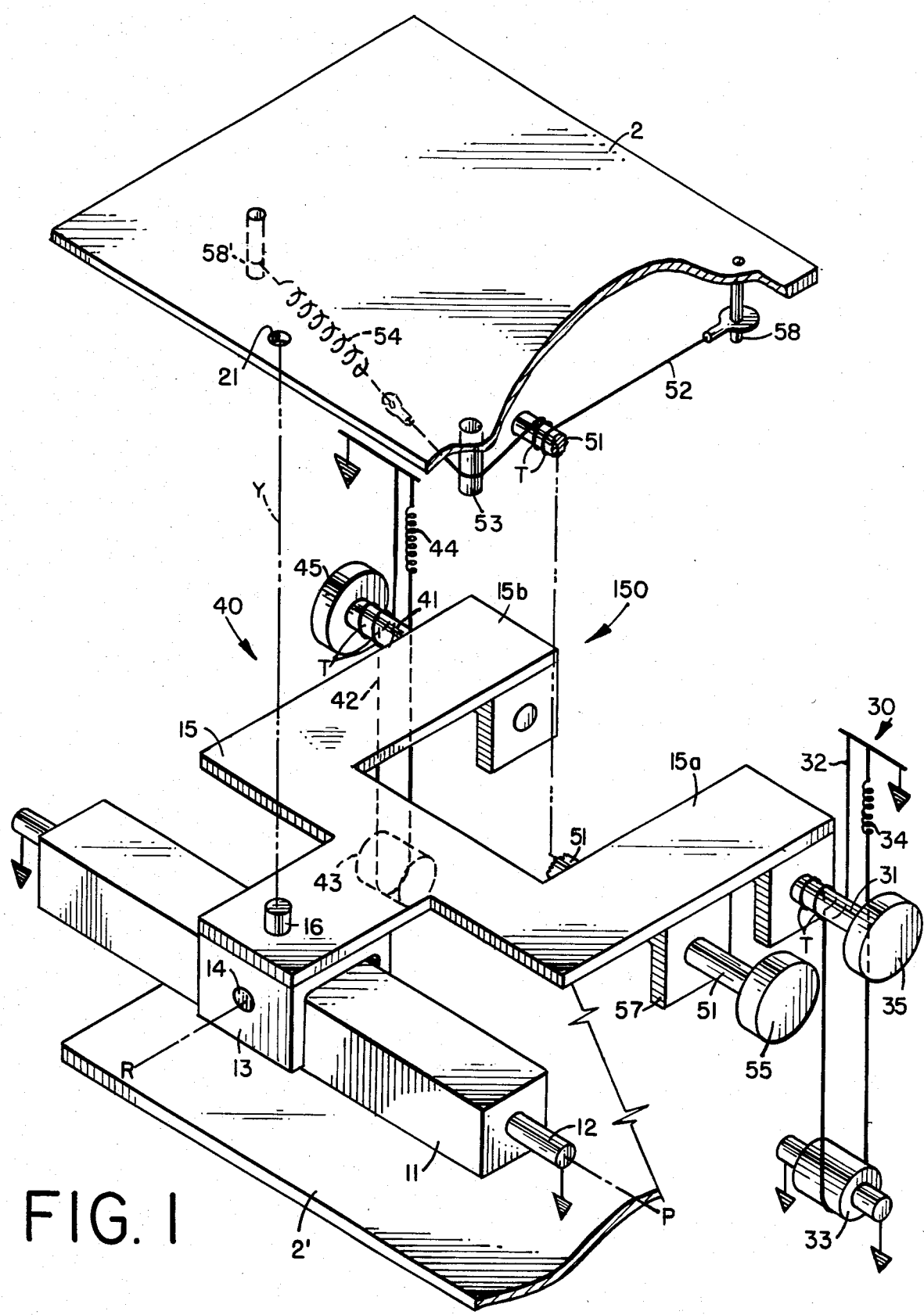
FIG. 1 is a simplified exploded schematic representation of the stacking stand according to the present invention.

Referring now to FIG. 1, the features of the present invention are shown in schematic form with regard to the mounting of projector support platform 2 above a like support platform 2' which would have the same mounting scheme as the platform 2 and which may also comprise additional platforms mounted above platform 2 although not shown. For the sake of clarity, only a single mounting is illustrated.

The mounting to a frame, not shown but preferably comprising four vertical, parallel members into parallel transverse rows, comprises a gimbal 1 which includes a first rectangular member 11 having shaft ends 12 and coinciding with the pitch axis P. The shaft 12 is rotatably mounted in the frame but horizontally and vertically fixed as shown. The gimbal also comprises a bracket 13 which is mounted for pivotal movement about pin 14 which coincides with the roll axis R. Also connected to bracket 13 is plate 15 which has pin 16 extending therefrom and corresponding to the yaw axis Y and to which mounting plate 2 is connected for pivotal movement about pin 16 via aperture 21.

Based upon the mounting scheme already disclosed, it should be clear that in order to make adjustments about the pitch and roll axes, the plate 15 must be moved to cause pivotal rotation about pins 12 and 14. Pure rotation around pin 12 can be achieved by lifting ends 15a and 15b simultaneously, while roll-axis adjustment can be achieved by movement of end 15a or 15b individually. This adjustment is carried out by the cable and shaft mechanisms 30 and 40 which independently move ends 15 and 15b as will be described.

These adjusting mechanisms, 30 and 40, comprise shafts 31, 41 which are rotatably mounted in brackets 37, 47 attached to plate 15. Also provided are cables 32, 42 which have at least one turn T about shafts 31, 41 and are looped around cylindrical pins 33, 43 which are fixed vertically to the frame but may rotate about their longitudinal axes. While pins 33, 43 are shown to be below shafts 31, 41, they may also be above same, however the free ends of the cables 32, 42 must be fixed to the frame on the opposite side of the shafts 31, 41. As shown, the free ends of cables 32, 42 are fixed to the frame above shafts 31, 41 and are connected by means of springs 34, 44 which are under tension which place the cables under tension. By means of knobs 35, 45 which are attached to shafts 31, 41, the shafts are rotatable causing them to ride along the cable 32, 42 and thus effect movement of ends 15a and 15b in the vertical direction.

The cables 32, 42 are preferably made from nylon jacketed stainless steel although unjacketed cable of any suitably strong material may also be used. While the cable may be wrapped with a single turn around the shaft 31, 41, it has been found that slippage can be reduced by wrapping the cables several times around the shaft. By rotatably mounting shafts 31, 41 in brackets 37, 47 with some friction, inadvertant rotation of the shafts 31, 41 is prevented and therefore the combination of the cable wrap and the friction force on the shafts makes it extremely difficult to move base 2 about the pitch or roll axes unless the knobs 35, 45 are intentionally rotated.

In order to achieve adjustment of the yaw position of the platform 2, a similar shaft and cable mechanism 50 is provided having a shaft 51 rotatably mounted in bracket 57 connected to plate 15 and having a knob 55 at the end thereof. A cable 52 is wrapped around shaft 51 and connected at one side to pin 58 connected to platform 2 and disposed around cylindrical pins 53 which is fixed vertically to platform 2 but may rotate about its longitudinal axis, the other end thereof connected on the other side of shaft 51 under tension by means of spring 54 to pin 58' connected to the platform 2. Rotation of the platform 2 about pin 16 is effected in response to rotation of knob 55. Inadvertant shifting of platform 2 about pin 16 is prevented in same fashion as described hereinbefore.

Figure 2:
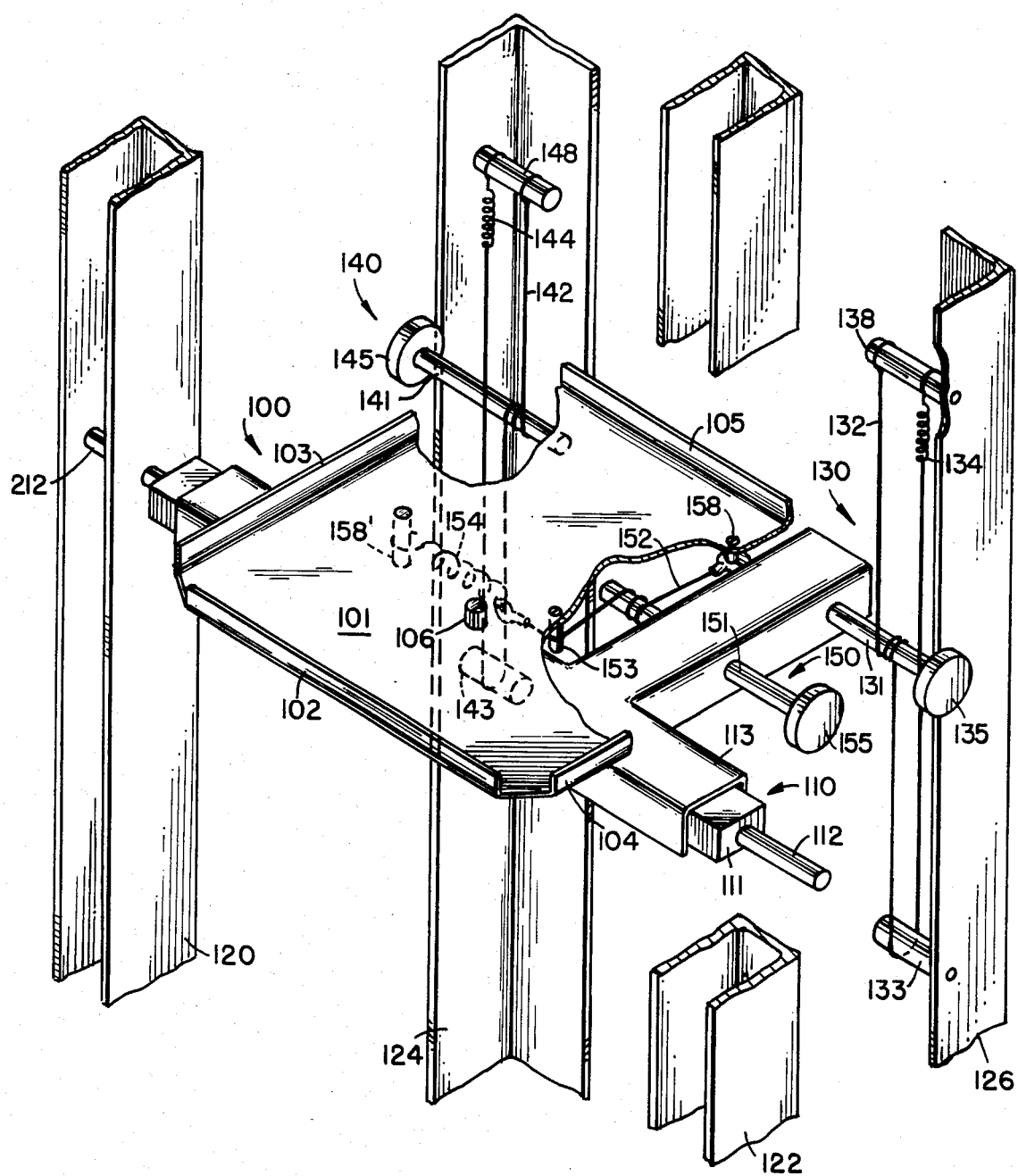
FIG. 2 is a perspective view of another embodiment of the present invention.
Figure 3:
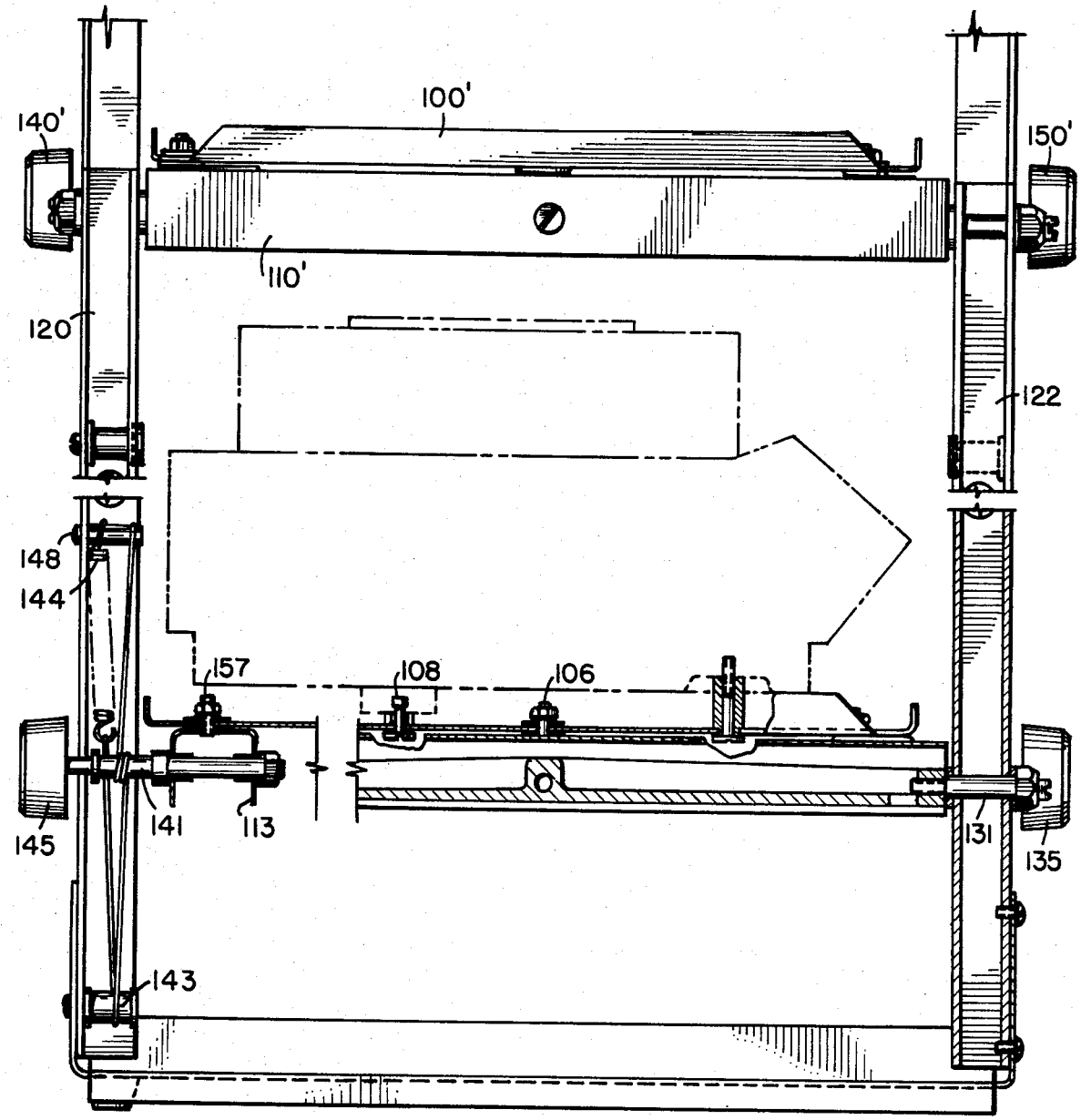
FIG. 3 is a side view of the stacking stand according to FIG. 2.
Figure 4:
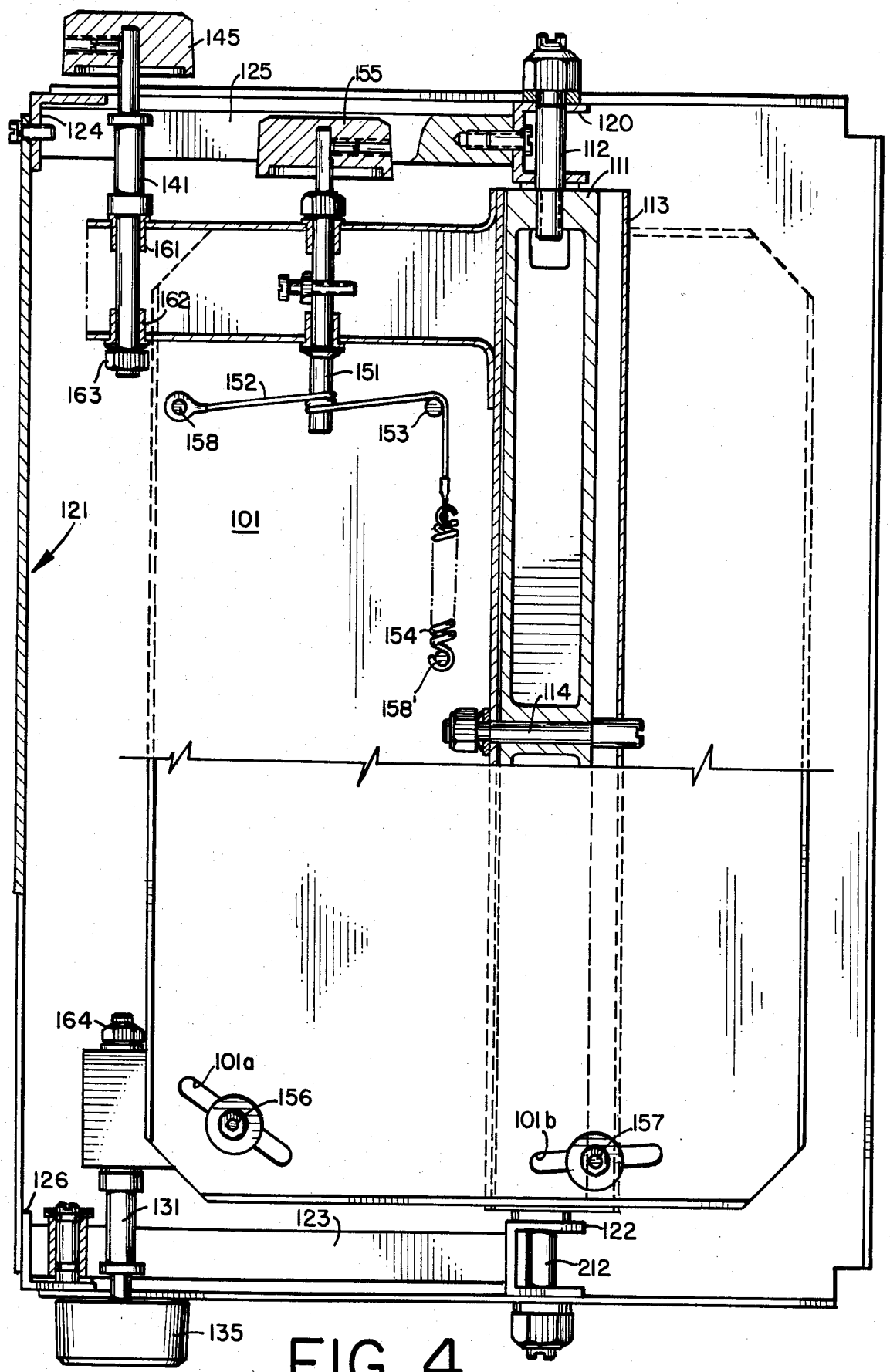
FIG. 4 is a bottom view of the stacking stand according to FIGS. 2 and 3.

Referring now to FIGS. 2-4, a preferred embodiment of the present invention is shown.

In the embodiments shown, the frame comprises four vertical and parallel members including two L-shaped members 124 and 126 in a front transverse row and two U-shaped members 120 and 122 in the rear transverse row. The rails are connected together at the bottom thereof by a base 127 and are further interconnected by horizontal framed members 121, 125 and 123.

The frame holds at least one projector mounting platform 100, preferably two or more since the ability to adjust the pitch, roll and yaw of the projector is particularly advantageous when one seeks to match up two projectors on the same screen area. In FIG. 3, two platforms are shown, with the upper of the two having the descriptive labels primed.

The projector supporting platform 100, includes a substantially planar portion 101 designed to accept fittings 108 for firmly clamping several different types of projectors. Side walls 102-105 may be used to provide support for the projector, as well as to provide stiffness.

Gimbal 110 includes member 113 pivotally connected via pivot pin 114 to cross bar 111 which in turn is connected by means of pivot pins 112 and 212. Cross bar 111 pivots about pins 112 and 212 but is otherwise fixed in place by rails 120 and 122.

The planar portion 101 pivots about pivot pin 106 with respect to the gimbal 110 and includes slots 101a and 101b into which screws 156 and 157 are slidably received and engage in member 113.

The pitch and roll adjustment mechanisms 130 and 140 comprise shafts 131, 141 rotatably mounted in gimbal frame 113 with bearings 161, 162. The ends of shafts 131, 141 are threaded to receive locknuts 163, 164 which are adjusted to bear against bearings 161, 162 to provide the friction necessary to prevent slippage as has been explained hereinbefore. Knobs 135, 145 are provided at the ends of shafts 131, 141 for rotating same. The mounting of the cables 132, 142 uses rotatably mounted cylindrical members 133, 143 which are mounted on rails 126 and 124 respectively below shafts 131 and 141 and cable 132, 142 is wrapped around shaft 131, 141 and connected to cylindrical pins 138, 148 mounted above shafts 131, 141 at one free end thereof with the other free end connected via springs 134, 144 to pins 138, 148.

The yaw control 150 comprises shaft 151 having knob 155 at the end thereof and rotatably mounted in frame 113. Cable 152 is connected to vertically disposed pin 158 mounted on platform 101, wrapped around shaft 151, disposed about a vertically disposed rotatable member 153 mounted on the platform 101 on the other side of the shaft 151, and the other end thereof connected to spring 154 which is in turn connected to pin 158' mounted on platform 101. Locknut 165 is used to provide the necessary friction on shaft 151.

As shown in FIG. 3, another projector mounting arrangement is provided above the one just described and including the gimbal 110' according to the mounting platform 100' and having the adjustments 140' and 150' therefor.

In the embodiment shown in FIGS. 2-4, it is particularly advantageous that the controls for adjusting the pitch, roll and yaw are provided at the sides of the frame, so as to enable the user to make adjustments from either in front of or behind the projectors during use. The controls for pitch, roll and yaw adjustment are particularly accessible due to the construction of the present invention and are therefore particularly advantageous.

It will be appreciated that the instant specification and claims are set forth by way of illustration and not limitation, and that various modifications and changes may be made without departing from the spirit and scope of the present invention.

What is claimed is:

1. A projector stacking stand for supporting at least one image projector, comprising:

a. a frame;
b. at least one mounting platform for supporting an image projector;
c. means connecting said mounting platform to the frame for enabling adjustment of the pitch, roll and yaw thereof relative to the frame, the connecting means comprising;
  i. a gimbal having three discrete pivot axes corresponding to the pitch, roll and yaw axes,
  ii. means for moving the gimbal about the pitch and roll axes comprising at least one cable having at least one turn around cooperating shafts, means connecting the cable to the frame under tension and means for rotating each shaft to effect movement of each shaft along its cable, whereby pitch and roll adjustments are obtained by rotating the shafts and iii. means for rotating the base about the yaw axis relative to the gimbal wherein the means for moving the gimbal about the pitch and roll axes comprises two shafts, means mounting each shaft on the gimbal for independent rotation with the axes thereof disposed parallel to the pitch axis, a cable for each shaft having at least one turn therearound, means connecting each cable to the frame under tension with a portion above and below the turn around the shaft and means for rotating each shaft to effect vertical movement of each shaft along its cable, whereby pitch adjustment is obtained by rotating the two shafts simultaneously in the same direction and roll adjustment is obtained by rotating the shafts individually.

2. The projector stacking stand according to claim 1, wherein the frame comprises four parallel vertical members with two front and two rear members disposed in parallel transverse rows, wherein the pitch axis of the gimbal is vertically fixed in the two rear members and the means connecting the cables to the frame is disposed at the two front members and comprises first and second cylindrical members each fixed horizontally to a front member on one side of the shaft and about which the cable is looped and means fixed to the front members on the other side of the shaft and connected to the ends of the cables and including springs applying tension to the cables.

3. The projector stacking stand according to claim 2, further comprising means for releasably locking the base in position comprising means for preventing rotation of said shafts.

4. The projector stacking stand according to claim 2, wherein the means rotatably mounting each shaft comprises means applying a friction force thereon to prevent free rotation of the shaft.

5. The projector stacking stand according to claim 1, wherein the cable comprises nylon jacketed stainless steel.

6. The projector stacking stand according to claim 1, wherein the means rotating the base about the yaw axis comprises a third shaft, means rotatably mounting the shaft on the gimbal, a third cylindrical member fixed to the base on one side of the shaft, a third cable having at least one turn around the third shaft and looped around the third cylindrical member and means connecting the ends of the third cable to the base on the other side of the shaft with the third cable under tension.

7. This projection stacking stand according to claim 1, wherein the two shafts providing pitch and roll adjustment are loosely coupled together so as to limit their relative rotation and thereby to limit the amount of roll adjustment permissible.

* * * * *